Aug. 28, 1934.     J. P. ZALLEA     1,971,928
DUO-SELF-EQUALIZING EXPANSION JOINT
Filed April 1, 1932     2 Sheets-Sheet 1
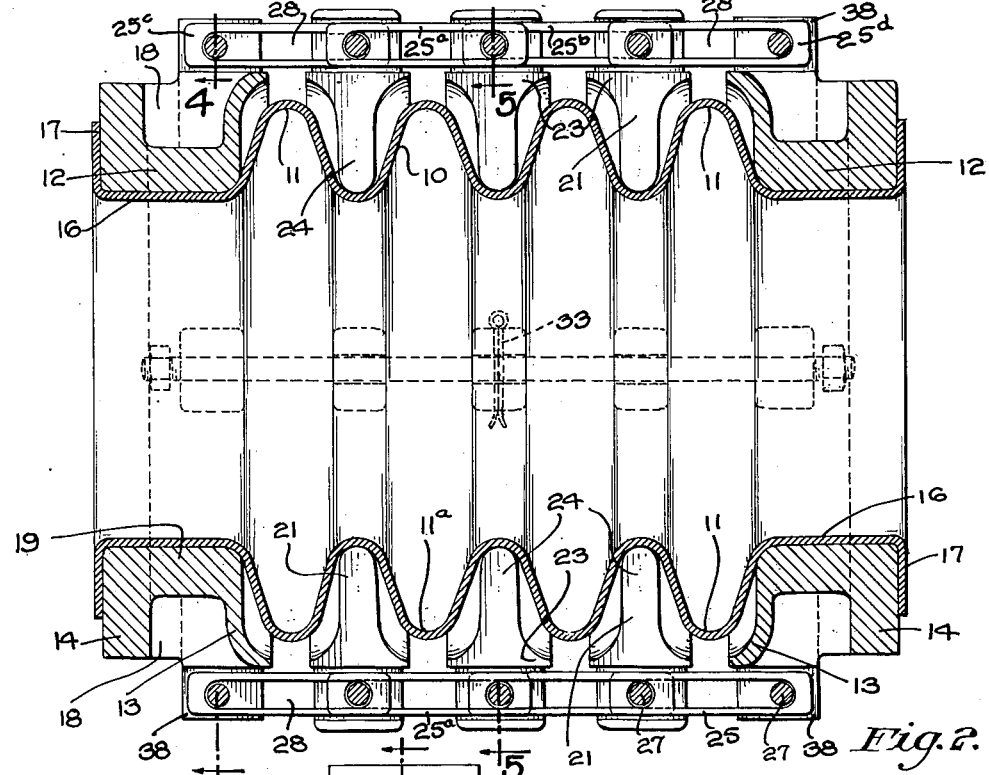
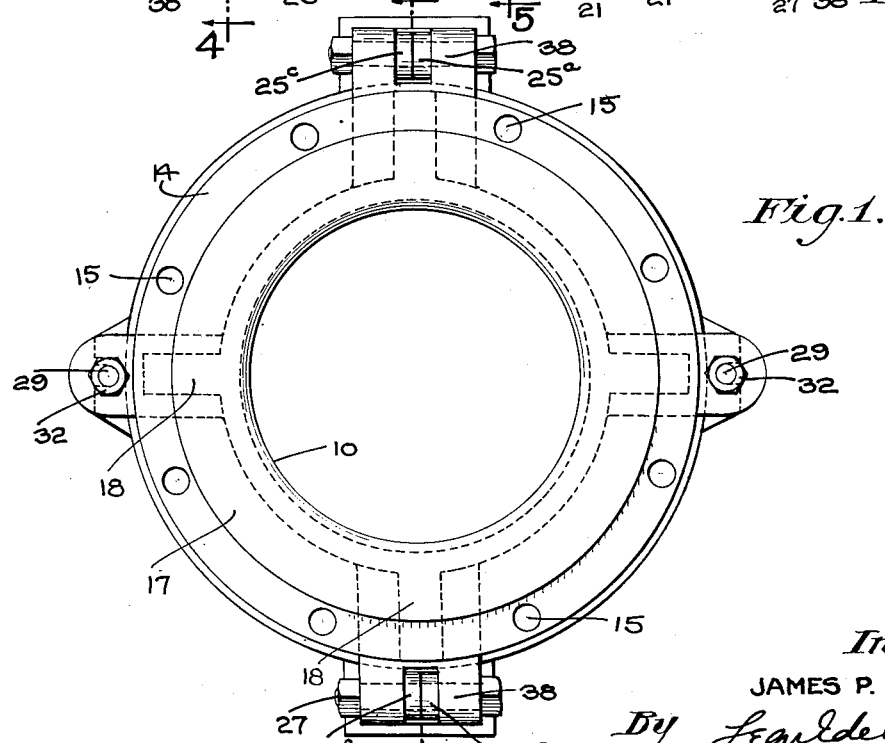
Fig.2.
Fig.1.
Inventor
JAMES P. ZALLEA
By Leo Edelson
Attorney.

Aug. 28, 1934.   J. P. ZALLEA   1,971,928
DUO-SELF-EQUALIZING EXPANSION JOINT
Filed April 1, 1932   2 Sheets-Sheet 2

Inventor
JAMES P. ZALLEA
By Leo Edelson
Attorney.

Patented Aug. 28, 1934

1,971,928

UNITED STATES PATENT OFFICE 1,971,928

DUO-SELF-EQUALIZING EXPANSION JOINT

James P. Zallea, Philadelphia, Pa.

Application April 1, 1932, Serial No. 602,425

3 Claims. (Cl. 285—90)

This invention relates to expansion joints adapted to compensate for changes in length of steam, air, water and other pipe lines where such changes in length are produced by temperature variations.

Heretofore and prior to this invention, various attempts had been made by those skilled in the art to produce so-called "self-equalizing" expansion joints. These joints ordinarily comprise an inner seamless tube of corrugated metal to the opposite ends of which are respectively secured a pair of flanges or other means, such as welding nipples, for securing the joint in the pipe line. The flange type of joint is adapted to be bolted into position whereas the welding type is adapted to be welded into the pipe line. In all cases, various devices have been employed for preventing the collapse of the corrugated inner tube. While these devices are more or less effective in preventing the collapse of the corrugated tube when subjected to compressive forces, I have found that they are not sufficiently effective to adequately prevent excessive expansion or elongation of the corrugated tube when the same is subjected to tension. It will be understood, of course, that in order to obtain the most efficient operation and to insure an extended period of use of the joint, it is necessary that means be provided for limiting the degree of flex to which the corrugations may be subjected. Unless such means are provided, constant flexing of the corrugations beyond the elastic limit of the metal would soon result in rupture of the corrugated tube and consequent failure of the joint.

Having in mind the above premises, it is among the principal objects of the present invention to provide an expansion joint wherein means are provided for maintaining uniform and within predetermined limits the degree of expansion and contraction to which each corrugation of the inner tube may be subjected during the use of the expansion joint.

A further object of the invention is to provide means for effectually precluding any excessive expansion or elongation of the corrugated tube or of any single corrugation thereof, thereby preventing untoward distortion of said corrugations.

A further object of the invention is to provide a simple, compact and relatively inexpensive but highly efficient expansion joint wherein means are provided for limiting not only the extent to which the joint may be compressed axially but also the extent to which the joint may be elongated. In other words, my improved expansion joint is self-equalizing when under tension as well as when under compression.

Still another object of the invention is the provision of means so arranged and operative as to automatically insure uniform elongation of each corrugation when the joint is subjected to tension, all without regard to the number of corrugations employed and without decreasing the flexibility thereof.

A still further object of the invention is the provision of a plurality of suitably interconnected equalizing rings for effecting the aforementioned objects in combination with means for insuring at all times a coaxial alignment of said rings, the alining means being operative to prevent angular displacement of any ring relatively to the others.

Other objects of the invention and advantages resulting therefrom will appear more fully hereinafter, it being understood that the invention consists in the combination, construction, location and relative arrangement of parts, all as will be described more fully hereinafter, as shown in the accompanying drawings, and as finally pointed out in the appended claims.

In the said accompanying drawings:—

Figure 1 is an end elevational view of the expansion joint constructed in accordance with and embodying the principles of my invention;

Figure 2 is a longitudinal sectional view thereof;

Figure 3:
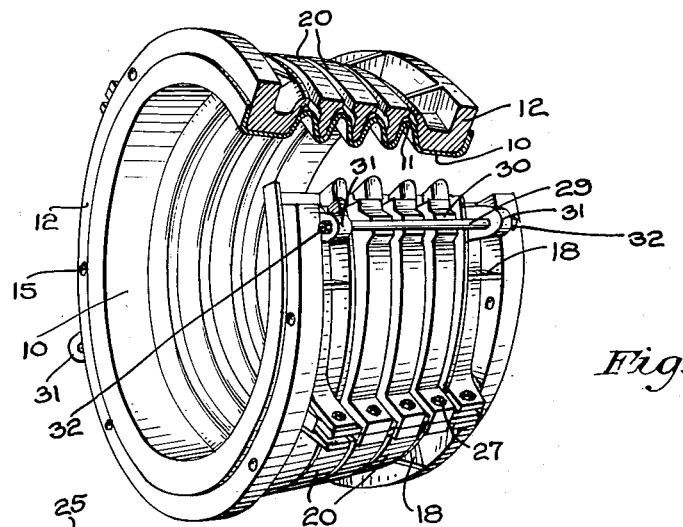
Figure 3 is a perspective view of the joint showing a portion thereof cut out for illustrative purposes.
Figure 4:
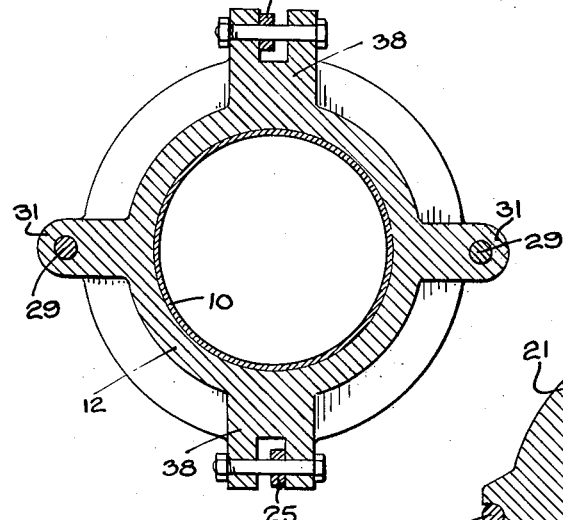
Figure 4 is a cross-sectional view taken on the line 4—4 of Figure 2.
Figure 5:
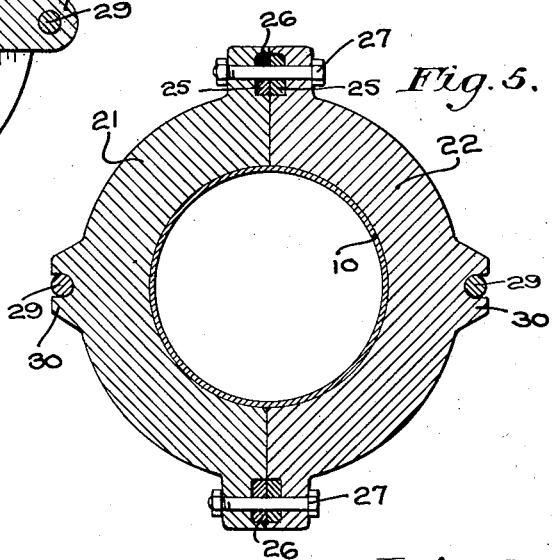
Figure 5 is a cross-sectional view taken on the line 5—5 of Figure 2.

Referring now more particularly to the drawings, it will be observed that the expansion joint as constructed in accordance with the present invention comprises an inner seamless tube 10 of copper or other suitable metal, this tube being provided with a plurality of uniformly formed, axially spaced corrugations 11. The depth of the corrugations and the number thereof may be varied as desired depending upon the degree of expansion which may be required of the joint in a particular installation. Secured to opposite ends of the corrugated tube 10 are the bolting flanges 12, these latter being preferably of the cross sectional shape best shown in Figures 2 and 3.

Preferably, the bolting flanges 12—12 are of substantially channeled cross section, the inner wall 13 of each channel flange being arcuately formed and of sufficient depth to properly accommodate the immediately adjoining end corrugation 11. The outer wall 14 of each channeled flange 12 extends radially of the longitudinal axis of the joint and is provided with a plurality of bolt holes 15 through which the securing bolts (not shown) may be projected for securing the end flanges to the pipe sections to be joined together. In order to provide a most effective connection between the bolting flanges and the corrugated inner tube 10, the opposite ends of the latter are respectively extended, as at 16, through the flanges 12—12 and then turned outwardly, as at 17, to overlie the outer faces of the flanges. This method of securing the bolting flange to the end of the corrugated inner tube is known in the art as "Valstoning". In order to adequately strengthen the bolting flanges 12—12, it is preferable to provide a plurality of integrally formed ribs 18 extending between the inner and outer walls of each channeled flange, said ribs extending radially of the basal wall 19 of the channeled bolting flange.

It will be understood that the channeled bolting flanges 12—12 are each integrally formed as a circumferentially continuous annulus. Fitted about the corrugated inner tube 10 are a plurality of cast-iron, steel or other metal equalizing rings 20, one of these rings being fitted between each pair of corrugations 11. Each of these equalizing rings 20 comprises a pair of semi-circular sections 21 and 22 the ends of which are adapted to be connected together to constitute in effect a circumferentially continuous ring for controlling the expansion of the joint and equally distributing it over each corrugation. As appears most clearly in Figures 2 and 3, the equalizing rings are each of generally T-shaped cross section, the outer heads 23 of the rings being relatively so proportioned and arranged that when the joint is subjected to compressive forces they will abut one another to thereby prevent excessive collapse of the corrugations 11. The bodies 24 of the equalizing rings extend radially inwardly of the corrugated tube to an extent sufficient to bear snugly against the external surface of the tube, the opposed surfaces of each ring being so contoured that when the rings are forced into abutting relation sufficient space will be provided between each pair of adjoining rings as to accommodate the compressed corrugations, thus preventing any pinching of the corrugations between the rings.

While the equalizing rings 20 as just described are satisfactorily operative to prevent the utter collapse of any one or more of the corrugations 11, they are not in themselves sufficiently operative to prevent excessive elongation of one or more of the corrugations. For example, it is entirely possible that under certain conditions the expansion to which a joint is subjected might be so great as to cause an excessive elongation or lateral distortion of the corrugation 11ª (see Figure 2). This elongation of the corrugation might be so pronounced that the corrugation would no longer be able to assume its original shape in consequence of which the efficiency of the joint would be seriously impaired, if not entirely destroyed. The equalizing rings in themselves are not adapted to prevent this very possible occurrence unless some means is provided for limiting the movement of the equalizing rings as well away from each other as toward each other.

To overcome this possibility of failure of the joint when subjected to expansion, I provide a series of slotted links 25, each link being adapted to limit the extent of separation permitted between a pair of adjoining equalizing rings. In order to facilitate the installation of those links, the abutting ends of the semi-circular sections 21 and 22 are complementally notched or recessed, to provide a slot 26 within which the end of a link may be received. The same bolts 27 which serve to secure together the sections 21 and 22 of each equalizer ring 20 serve also to maintain the links in position, these bolts being respectively projected through the alined slots 28 of adjoining pairs of links.

As appears most clearly in Figure 2, the equalizing rings 20 are respectively interconnected by the slotted links 25ª and 25ᵇ. The outermost rings are respectively connected to the bolting flanges 12—12 by the slotted links 25ᶜ and 25ᵈ. Due to the coaction of the bolts 27 and these slotted links, it will be apparent that the degree to which the equalizing rings may be separated is limited, the limit of separation being dependent upon the length of the link slots 28. The outer ends of the links 25ᶜ and 25ᵈ are slidably anchored to bifurcated lugs or bosses 28 suitably formed on the bolting flanges 12—12. The links 25 being slidable relatively to each other, it becomes apparent that they do not interfere with the free operation of the expansion joint during the compression thereof. However, they do serve most effectively to prevent an elongation of the joint beyond a predetermined limit and they also are operative to effectually prevent a greater separation between one pair of equalizer rings than between another pair thereof. There is thus provided means for insuring maximum and uniform control of the expansion of joint, particularly with respect to each corrugation thereof.

It will be observed that two sets of expansion-limiting links are employed, both sets extending axially of the expansion joint and being equally spaced about the circumference thereof. In order to insure against possibility of the links binding against one another, means have been provided for insuring against relative angular displacement of the equalizing rings. This means comprises a pair of alining rods 29—29 arranged 180 degrees apart, each rod being disposed preferably equidistantly between the diametrically opposed sets of links 25. If desired, more than two alining rods may be employed and in such case they are arranged equidistantly about the circumference of the joint, preferably symmetrically with respect to the opposed sets of links 25. The alining rods 29 are preferably received within bifurcated lugs or bosses 30 respectively formed on each equalizer ring, the opposite ends of each rod being respectively projected through suitably apertured bosses 31 integrally formed on the bolting flanges 12—12. In order to prevent longitudinal displacement of the alining rods 29 the freely projecting extremities thereof may be provided with limit nuts 32 or the like, it being observed that the rods 29 are each of an effective length at least sufficient to permit the free expansion of the joint to the fullest extent afforded by the slotted links 25. In other words, the rods 29 are never subject to the compressive or tensile stresses to which the joint is subjected in use, but instead serve merely to maintain the equalizing rings in fixed alinement. Instead of the end nuts 32, the rods 29 each may be provided with a center pin 33 which is projected through the alining boss 31 of the central equalizer ring, thereby maintaining the alining rods against longitudinal displacement without however interfering with the requisite free movement of the equalizer rings relatively to each other. The alining rods 29 serve also to prevent buckling of the joint and more particularly, they maintain the equalizing rings and the bolting flanges in true parallel relation. Moreover, the rods 29 serve effectually to prevent any tendency for the rings and flanges to become axially misalined.

In the foregoing description and in the accompanying claims, it will be understood that by expansion and contraction or compression of the joint is meant an axial elongation or shortening thereof. In other words, the reference is to variations in the length of the joint instead of to variations in the diameter thereof. It will also be understood, of course, that the invention is capable of various changes and modifications from time to time without departing from the real spirit or general principles thereof, and it is accordingly intended to claim the same broadly, as well as specifically, as indicated by the appended claims.

What is claimed as new and useful is:—

1. In an expansion joint, in combination, a corrugated tubular member, a ring secured to each end of said tubular member, each of said rings being provided with an apertured bolting flange, annular members respectively arranged within and extending circumferentially about the corrugations of said tubular member, said members being respectively of substantially T-shaped cross section and arranged with the radial webs thereof seated within the valleys of the said corrugations whereby the axially extending heads thereof are adapted for abutting engagement to limit the permissible contraction of said corrugations, the annular heads of said members being respectively provided with radially projecting members each of which is slotted at diametrically opposed points to provide opposed sets of substantially alined slots arranged exteriorly of and in substantially parallel relation to the axis of said tubular member, and a plurality of slotted links projected through each set of said alined slots for respectively interconnecting each pair of adjacent annular members whereby to limit the permissible elongation of said tubular member.

2. In an expansion joint of the character defined in claim 1 wherein said slotted links are arranged edgewise with respect to the surface of said tubular member and substantially in a diametrical plane of the latter, and wherein is provided a rod extending longitudinally of said corrugated member and in engagement with each of said annular T-shaped members for maintaining the latter in axial alinement and for precluding angular movement therebetween.

3. In an expansion joint, in combination, a corrugated tubular member, a pair of flanged securing rings respectively provided at opposite ends of said tubular member, a plurality of semicircular sections adapted to form split rings of substantially T-shaped cross-section, said rings being arranged with the radial sections thereof respectively seated within the corrugations of said tubular member for precluding the contraction of the latter beyond a predetermined limit, the meeting extremities of each pair of said semicircular sections being grooved to provide a plurality of longitudinally aligned slots in the split rings when the sections thereof are secured together, a plurality of slotted links projected through said aligned slots, and bolts projecting commonly through the meeting extremities of each pair of said sections and through the slotted links embraced therebetween, said bolts serving commonly to secure said ring sections together and to limit the extent of longitudinal separation permissible between said slotted links.

JAMES P. ZALLEA.